Sept. 9, 1958    T. W. JAMES    2,851,132
FRICTION ELEMENT
Filed Feb. 16, 1955
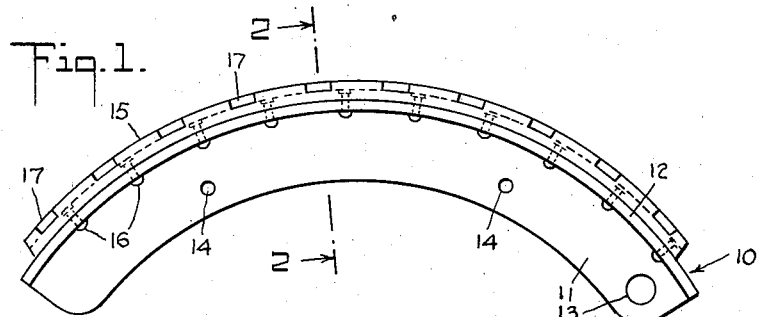
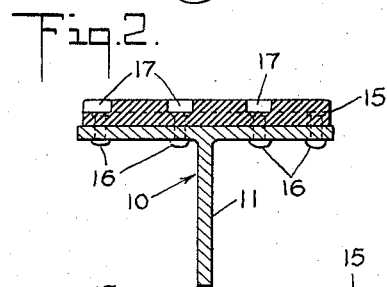
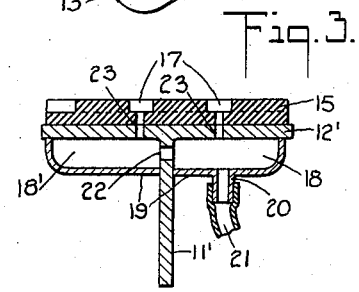
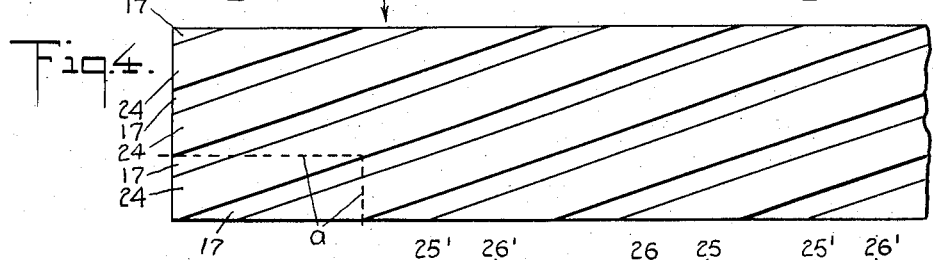
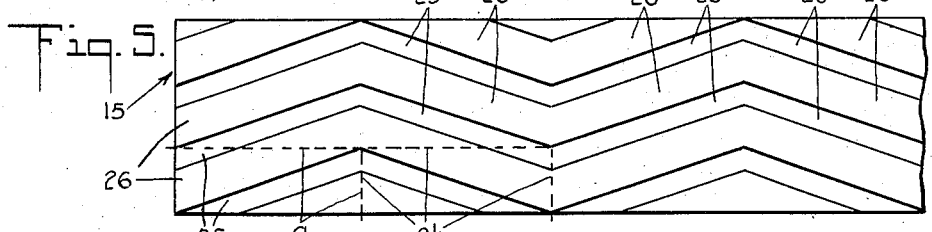
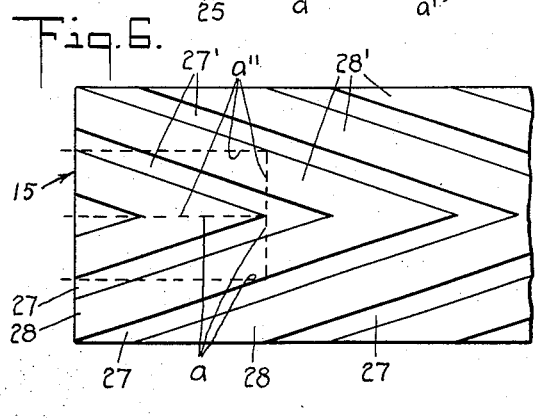
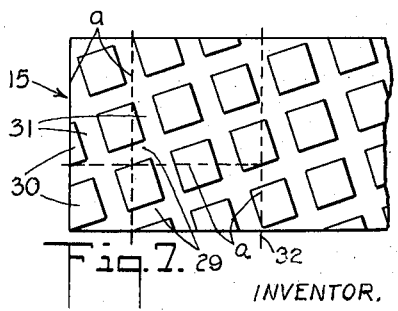
INVENTOR.
THOMAS W. JAMES
BY Howard E. Thompson Jr.
ATTORNEY

United States Patent Office 2,851,132
Patented Sept. 9, 1958

2,851,132

FRICTION ELEMENT

Thomas W. James, Fair Lawn, N. J.

Application February 16, 1955, Serial No. 488,581

3 Claims. (Cl. 188—264)

This invention relates to friction elements of the type employed as brake and clutch facings in various machines and apparatus and particularly to friction elements for use as the brake linings in various automotive vehicles. More particularly the invention relates to friction elements of the class described which provide a cooling means in the use and operation thereof while at the same time insuring uniform wear on both the friction element and the surface with which it co-acts. Still more particularly the invention relates to friction elements of the class described wherein cooling is effected at least in part by the relative movement of the co-acting parts and wherein this cooling may be supplemented by means of air under pressure.

The problem of overheating in friction elements, particularly in the case of brake shoes for automotive vehicles has long been recognized. In the automotive field particularly, however, this problem has become increasingly more serious with the progressive increases in the speed of highway travel. It has been found for example that the quick stopping of vehicles traveling fifty, sixty, or more miles an hour can generate so much heat as to induce malfunctioning or non-functioning of the brakes. The various means heretofore employed for counteracting such overheating have been quite ineffectual due to their slowness in dissipating heat and failure to reach and cool the friction element itself.

The improved friction elements in accordance with the present invention have met these difficulties by providing cooling means facilitating the circulation of air between a friction element and its co-acting part in both the operative and inoperative positions thereof and throughout substantially the entire extent of the areas of contact therebetween. Regarded in certain of its broader aspects the improved friction element in accordance with my invention comprises a body of friction material having a plurality of grooves in the friction face thereof forming air passages, said groves being disposed angularly, with respect to the path of relative movement between said friction element and its co-acting part, and the relationship between the width and spacing of said grooves and the angularity thereof being such as to provide substantial uniformity in the amount of contact between the friction material and said co-acting part along all lines parallel to and all lines perpendicular to said path of relative movement. As further characterizing the invention the arrangement of grooves and ribs formed therebetween in the friction material is such as to provide a uniform overall pattern comprising whole multiples of a basic pattern, said basic pattern being a rectangle having one pair of sides extending in the direction of relative movement between the friction element and its co-acting part, a diagonal to said rectangle falling along the juncture between a rib and a groove in said friction material and each side of said rectangle traversing one rib and one groove in said friction material. In the over-all pattern of a friction element the basic pattern and mirror images thereof can be repeated in any end-to-end or side-by-side relationship in which the corresponding rib and groove parts are contiguous. In the special instance where the basic pattern has a length "$l$" equal to $n \cdot w$ where "$w$" is the width of the basic pattern and "$n$" is an integer greater than one, the basic pattern can be repeated "$n$" times in side-by-side relationship and superimposed by the same pattern repeated perpendicularly thereof "$n$" times in side-by-side relationship to provide a friction element having a uniform series of crossed grooves providing spaced lugs which form the friction surfaces of the friction element.

Novel features of the invention will be readily understood from the following description taken together with the accompanying drawing in which preferred adaptations of the invention are shown, with the various parts thereof being identified by suitable reference characters in each of the views, and in which:

Fig. 1 is a side elevation view of a typical automotive brake shoe showing the lining thereof as comprising a friction element in accordance with the present invention;

Fig. 2 is a sectional view substantially on the line 2—2 of Fig. 1;

Fig. 3 is a view similar to Fig. 2 showing a modified construction wherein means is included for supplying cooling air under pressure;

Fig. 4 is a top plan view of a portion of the brake lining as shown in Fig. 1 indicating the overall pattern and unit pattern of grooves and ribs therein;

Fig. 5 is a view similar to Fig. 4 employing the same unit pattern of grooves and ribs arranged in a different over-all pattern utilizing mirror images of the basic pattern in end-to-end relationship;

Fig. 6 is a view similar to Fig. 4 showing a different overall pattern embodying the same unit pattern and its mirror images arranged in side-by-side relationship; and Fig. 7 is a view similar to Fig. 4 showing a further modified form of over-all pattern wherein multiples of the same unit pattern are arranged in perpendicularly superimposed relationship.

For purposes of illustration I have shown in Fig. 1 of the drawing a typical brake shoe 10 of the type generally used in pairs for operative engagement with inner surfaces of a cylindrical brake drum secured to the wheel of an automobile or other motor vehicle. The brake shoe 10 comprises a web member 11 and an arcuate cross-head 12 having a curvature conforming closely to that of a particular brake drum. The web portion 11 is provided with a pivotal aperture 13 and other apertures 14 of suitable size and arrangement for coupling the brake shoe with a particular operating mechanism. These details, however, form no part of the present invention and it is to be understood that the brake shoe 10 is representative of any type of backing member having friction elements as employed in brakes, clutches, and the like.

A friction element 15 in accordance with the present invention is secured to the arcuate cross-head 12 by means of rivets, screws, or other fastening elements 16 which are preferably arranged in the grooves 17 of the friction element. The grooves 17 extend about one-third to two thirds of the way through the friction element 15 and are arranged in diagonal patterns or combinations of diagonal patterns throughout the length of the friction element or brake lining 15 as will be more fully discussed in describing Figs. 4 to 7 of the drawing.

The friction element 15 may be fashioned from various materials having the desired properties of strength and resistance to heat in which the grooves can be fashioned either by molding in the initial production of the friction material or by cutting or milling a preformed body or sheet of the friction material. For example the friction element can be comprised of a body of heat resistant fiberous material including a thermo-plastic binder in which the binder has been carbonized at the outer bearing surface thereof and to a suitable depth into the body by heat treatment applied to the surface of the body. Friction elements of this type and the method for producing the same are disclosed and claimed in United States Patents Nos. 2,045,452 and 2,045,453. It is to be understood, however, that various other friction materials can be employed and that the present invention is concerned with the physical form and construction of the friction element rather than its particular composition.

In Fig. 3 of the drawing I have shown a modification of the construction as shown in Fig. 2 wherein means is provided for supplying air under pressure to the grooves in a friction element through apertures or air passages which extend through the backing or supporting member for the friction element as applied to a brake shoe having a web part 11' and an arcuate cross-head 12' similar to the web 11 and cross-head 12 shown in Figs. 1 and 2. An air chamber 18 is provided between the cross-head 12' and wall portions 19 which extend from the web 11' to opposed edges of the cross-head 12'. Air entering chamber 18 through inlet 20 and flexible air hose or the like 21 may freely pass through apertures 22 in the web part 11' to the opposed air chamber 18'. Alternatively separate air inlets 20 may be provided communicating with the chambers 18 and 18' in which event the connecting apertures 22 might be omitted. At suitably spaced intervals in the grooves 17 of the friction element 15 apertures or air passages 23 are provided which extend through the friction element 15 and cross-head 12' establishing communication with the air chambers 18, 18'. Air entering the chambers 18, 18' is thus discharged through the apertures 23 to the grooves 17 to exert a local cooling action both on the friction element 15 and on the surface of the brake drum or other member with which it co-acts.

The feeding of air to the chambers 18, 18' can be associated with various functions and conditions of the friction element. Thus, for example, cooling air may be supplied during actual engagement between the friction element and its co-acting member, or for a suitable period of time after such engagement. Alternatively temperature sensitive means may be employed for feeding the cooling air during the entire interval that the temperature of the friction element 15 may exceed a predetermined level.

Fig. 4 of the drawing shows a plan view of the friction element 15 as shown in Figs. 1 to 3 wherein the grooves 17 are diagonally disposed and uniformly spaced apart to form ribs 24 which provide the bearing surfaces for the friction element. It will be noted that the overall pattern formed by the grooves 17 and ribs 24 comprises reproductions in side by side and end to end relationship of a unit pattern in rectangular form set off by the dotted lines "a." In this unit pattern a diagonal coincides with the juncture between a rib 24 and groove 17 and each side of the rectangle is of a length to extend across one of the ribs 24 and one of the grooves 17. It will be evident that with this unit pattern and with all whole multiples thereof all lines traversing the rectangular pattern parallel to the long sides thereof will contact equivalent lengths of ribs 24 and will over-lie equivalent lengths of grooves 17; and the same is true of all lines traversing said rectangular pattern in a direction parallel to the short sides thereof.

In the friction element made up of a plurality of the unit patterns arranged in side by side and end to end relationship as above described, the characteristics of the unit pattern which are thus reproduced in the over-all pattern of grooves and ribs assures that the wear on both the friction element 15 and the brake drum or other part with which it co-acts will be uniform. At the same time, the angular arrangement of the grooves 17 permits a circulation of air induced by the brake drum or other co-acting part moving with respect to the friction element 15 to effectively cool the friction element, as well as the brake drum or other co-acting part. This cooling effect is accelerated as previously described by providing for the forced feeding of air into the grooves 17 in the manner described in the previous discussion of Fig. 3 of the drawing.

It is to be understood that the relative width of the grooves 17 and ribs 24 and the relative width and length of the basic pattern "a" can be varied to a considerable extent. In addition, the relative size of the basic pattern to the over-all pattern of the friction element can be varied between wide limits provided, however, that the uniform wear characteristics above mentioned require that at least in a direction transverse to the direction of relative movement between the friction element and its co-acting part the friction element is of a width to accommodate a whole number of reproductions of the basic pattern. Thus for example Fig. 4 in its relationship to Figs. 1 to 3 indicates that the basic pattern is reproduced three times transversely of the brake band or friction element 15. If the size of the grooves 17 and ribs 24 were smaller the inherently smaller basic pattern might be reproduced four, five or more times transversely of the friction element 15.

In Figs. 5, 6 and 7 I have shown modifications in the over-all friction element pattern which although different in over-all appearance from that in Fig. 4 employ the same basic pattern in combination with its mirror images or in combination with the same pattern superimposed at right-angles to form cross-grooves imparting a waffled appearance to the friction element. Thus in Fig. 5 the grooves 25 and ribs 26 conform to a unit pattern "a" identical with that in Fig. 4 while the grooves 25' and ribs 26' conform to a unit pattern "a'" which is the mirror image of unit pattern "a" arranged in end to end contiguous relationship. The over-all pattern thus obtained provides a zig-zag arrangement of the grooves 25, 25' facilitating circulation of air in the grooves longitudinally of a friction element either wholly induced by the relative movement between the friction element and its co-acting part, or supplemented by air fed under pressure to the grooves in the manner previously described.

In Fig. 6 of the drawing the grooves 27 and ribs 28 are identical with the grooves 17 and ribs 24 as shown in Fig. 4 and provide the same rectangular unit pattern "a." The associated grooves 27' and ribs 28' constitute reproductions of a unit pattern "a''" which is the mirror image of pattern "a" arranged in side by side contiguous relationship. This provides an over-all pattern in the friction element 15 in which the alternate grooves and ribs longitudinally of the friction element appear as a series of darts. While this particular arrangement of grooves and ribs does not particularly facilitate circulation of air induced by the relative movement between the friction element 15 and its co-acting part, it will be evident that this arrangement can provide effective cooling when air under pressure is fed to the grooves in the manner previously described.

The over-all pattern of the friction element 15 as shown in Fig. 7 although quite different in appearance from those shown in Figs. 4 to 6, is still made up of a unit pattern "a" identical with that as shown in Figs. 4 to 6 with the grooves 29 corresponding with the grooves 17 and the intermediate portions 30 corresponding with the ribs 24 as shown in Fig. 4. In Fig. 7, as in the other figures, unit pattern "a" is of a length three times greater than its width and it will be evident that in Fig. 7 pattern "a" is produced three times transversely of the friction element 15. The same unit pattern is superimposed at right-angles to the first and repeated three times in side by side relationship providing grooves 31 disposed at right-angles to the grooves 29 and dividing the intermediate portions 30 into square bearing or friction surfaces. The three unit patterns "a" arranged transversely of the friction element 15 and the three unit patterns "a" superimposed perpendicularly thereto form a square unit pattern extending to the dotted line 32 in which all lines extending length-wise of the fritcion element 15 traverse equivalent amounts of bearing surface and all lines extending transversely of the friction element likewise traverse equivalent amounts of bearing surface. Thus this cross-groove or waffled pattern maintains the uniform wear characteristics for the friction element and its co-acting part in the manner previously described.

In the modified form of over-all pattern shown in Fig. 7 the relative size of the grooves and bearing surfaces can be varied to a considerable extent as can the relative length and width of the unit pattern "a." A limiting factor, however, is that the length of the unit pattern "a" should be a whole number "n" times the width of the unit pattern "a," and "n" should be an integer greater than one. Thus if "n" were two, the unit square pattern would comprise two unit patterns "a" arranged transversely of the friction element 15 and two unit patterns "a" superimposed thereon in perpendicular arrangement. Similarly if the unit pattern "a" were five times as long as it was wide so that the integer "n" is five, then five of the unit patterns "a" would be arranged transversely of the friction element 15 and superimposed by five unit patterns "a" disposed perpendicularly thereto. It will thus be apparent that the modification shown in Fig. 7 of the drawing perimts a very extensive variation in providing desired amounts of bearing surface and/or grooves for circulating cooling air through the friction element. With this crossed arrangement of grooves cooling may be effected either wholly by induced circulation of air due to relative movement between the friction element 15 and its co-acting part or by such circulation supplemented with air feed to the grooves under pressure in the manner previously described.

Various changes and modifications in the friction elements and manner of cooling same as herein disclosed will occur to those skilled in the art and it is to be understood that to the extent that such changes and modifications fall within the preview of the appended claims they constitute part of my invention.

I claim:

1. A friction element comprising a body of friction material having a plurality of grooves in the friction face thereof forming air passages between spaced ribs of friction material, said grooves being disposed angularly with respect to the path of relative movement between said friction element and the surface with which it coacts, the grooves and ribs in said friction element being arranged in an overall pattern consisting of a basic rectangular pattern repeated a whole number of times in side-by-side and a whole number of times in end-to-end arrangement, said basic rectangular pattern having one pair of sides extending in the direction of relative movement between said friction element and the surface with which it coacts, a diagonal to said rectangle being parallel to said ribs and grooves, and each side of said rectangle traversing the equivalent of one full rib and one full groove in said friction material, whereby the rib portions in the overall pattern of said friction element provide uniformity in the amount of contact between friction material and said co-acting surface along all lines parallel to and all lines perpendicular to said direction of relative movement between the friction element and co-acting surface.

2. A friction element as defined in claim 1 wherein said basic pattern and its mirror image are employed in end to end relationship with the corresponding groove and rib portions thereof contiguous.

3. A friction element as defined in claim 1 wherein said basic pattern and its mirror image are employed in side by side relationship with the corresponding groove and rib portions thereof contiguous.

References Cited in the file of this patent

UNITED STATES PATENTS

| De. 52,227 | Richardson | July 23, 1918 |
| 1,245,040 | Scaife | Oct. 30, 1917 |
| 1,923,872 | Loughead | Aug. 22, 1933 |
| 1,978,687 | Permain et al. | Oct. 30, 1934 |
| 2,150,186 | Pope | Mar. 14, 1939 |

FOREIGN PATENTS

| 151,198 | Australia | Oct. 25, 1937 |
| 807,511 | France | Oct. 19, 1936 |
| 808,675 | France | Nov. 24, 1936 |
| 537,069 | Germany | Oct. 30, 1931 |